United States Patent [19]

Kitagishi et al.

[11] Patent Number: 4,707,708

[45] Date of Patent: Nov. 17, 1987

[54] THERMAL PRINT HEAD

[75] Inventors: Tomoji Kitagishi; Akira Sasaki; Akiyoshi Hakoyama, all of Hitachi; Shigetaka Furukawa, Takahagi; Masafumi Suzaki; Ryooichi Kobayashi, both of Hitachi; Katsumasa Mikami, Ibaraki; Yoshihito Takahashi, Hitachi; Yousuke Nagano, Hitachi; Takeo Honma, Hitachi, all of Japan

[73] Assignee: Hitachi, Ltd., Tokyo, Japan

[21] Appl. No.: 911,323

[22] Filed: Sep. 25, 1986

[30] Foreign Application Priority Data

| | | | |
|---|---|---|---|
| Sep. 27, 1985 | [JP] | Japan | 60-212475 |
| Sep. 27, 1985 | [JP] | Japan | 60-212486 |
| Oct. 4, 1985 | [JP] | Japan | 60-220123 |

[51] Int. Cl.[4] .......................... G01D 15/10; B41J 3/20; H05B 1/00

[52] U.S. Cl. ............................... 346/76 PH; 400/120; 219/216

[58] Field of Search .................... 346/76 PH; 400/120; 427/58, 96, 402; 219/216

[56] References Cited

U.S. PATENT DOCUMENTS

| | | | |
|---|---|---|---|
| 4,259,564 | 3/1981 | Oakubo et al. | 219/216 |
| 4,463,246 | 7/1984 | Tatsumi et al. | 219/216 |

*Primary Examiner*—E. A. Goldberg
*Assistant Examiner*—Gerald E. Preston
*Attorney, Agent, or Firm*—Antonelli, Terry & Wands

[57] ABSTRACT

A thermal trasfer printer including a thermal head, and a platen positioned against the thermal head through a printing sheet. The thermal head has a substrate formed of heat insulating material, at least one glaze layer on a top surface of the substrate extending longitudinally thereof, a plurality of heat generating elements on the glaze layer, a plurality of electrodes each connected to the heat generating elements in a manner to form an opening for the heat generating elements and a protective layer for preventing the electrodes and heat generating elements from contacting the printing sheet to avoid their wear. A portion of the protective layer for protectng the heat generating elements has a height which is greater by more than 5 μm than the height of a portion of the protective layer for protecting the electrodes. The width of the glaze layer transversely of the substrate is less than 200 μm at a location which is 10 μm below a top surface of the portion of the protective layer for protecting the heat generating elements in a vertical direction. The platen is a flat platen and its deflection caused to occur by a biasing force exerted on the thermal is more than 0.02 time and less than twice as great as the height of the glaze layer.

7 Claims, 17 Drawing Figures

THERMAL PRINT HEAD

BACKGROUND OF THE INVENTION

This invention relates to thermal transfer printers each having a thermal head and a platen, and more particularly it is concerned with a thermal printer capable of printing also on a paper of rough surface with a high quality.

As disclosed in Japanese Utility Model Unexamined Publication No. 34447/85 and Japanese Patent Unexamined Publication No. 94373/85, there are two types of thermal transfer printers: one type has a thermal head and a platen of cylindrical shape positioned against the thermal head, and the other type has a thermal head and a platen of flat plate shape. In view of the principles of thermal printing, these thermal printers are characterized in being able to print characters on a sheet of ordinary paper. Printing sheets used in the thermal transfer printers referred to hereinabove have a relatively smooth, flat surface. This is because the use of sheets of paper of rough surface which are low in smoothness suffers disadvantages in that ink melted by the heated thermal head cannot flow to depressed regions of the surface of the paper and only adheres to the elevated regions thereof, with the result that voids, omission of printed characters, a reduction in the darkness of printed characters and symbols and other defects appear on the transfer-printed sheet. However, with an increasing popularization of thermal transfer printers, demand for the use of paper of rough surface to provide transferprinted sheets of high quality to reduce costs is growing nowadays.

Meanwhile proposals have been made to use, as disclosed in Japanese Patent Unexamined Publication No. 76272/84, a thermal head having heat generating elements located at the crest of each arcuate glaze layer to improve transfer of thermal energy to the sheet of paper to effect thermal transfer-printing satisfactorily.

However, it would be impossible to accomplish the object of providing a thermal transfer-printed sheet of high quality by using paper of rough surface merely by improving transfer of thermal energy to the transfer-printing sheet. Thermal heads of the prior art will be outlined by referring to FIGS. 1–4.

FIG. 1 shows in a schematic view a thermal head of the basic form used in a thermal transfer printer. As shown in the figures, a thermal head 1 comprises a substrate 2 formed of heat insulating material, such as ceramics, a plurality of glaze layers 3 on the substrate 2 extending lengthwise thereof and a plurality of heat generating elements 4 located on the crest of each glaze layer 3. Each glaze layer 3 has electrodes 5 and 6 connected to the heat generating elements 4, and a protective layer 7 for the heat generating elements 4 and electrodes 5 and 6. The electrodes 5 and 6 are connected to opposite sides or the left and right sides of the heat generating elements 4 to provide an opening A to define the size of transfer-printing dots. The protective layer 7 has the functions of preventing oxidation of the heat generating elements 4 and electrodes 5 and 6 which might otherwise be caused by their exposure to atmosphere and of avoiding wear which might otherwise be caused on the heat generating elements 4 and electrodes 5 and 6 as the thermal head travels on the surface of a sheet of paper or a transfer-printing film.

The dimensions of the glaze layers 3 may vary depending on the glass material used for their fabrication. Generally, however, their width w as measured transversely of the substrate is in the range between 800 and 1000 $\mu m$ and their height h as measured vertically of the substrate is in the range between 30 and 50 $\mu m$. As is clearly seen, their radius of curvature r is about 2000 $\mu m$ which is very large, owing to the fact that the width w is disproportionately greater than the height h. Thus the crest of each glaze layer 3 is substantially flat or planar. Consequently, the opening A for the heat generating elements 4 at the crest of each glaze layer 3 is substantially planar, and the height $H_1$ of the top surface of each heat generating element 4 as measured from the surface of the substrate 2 (which is also the case with heights $H_2$, $H_3$, $H_4$ and h presently to be described) is smaller than the height $H_2$ of the highest portions of the electrodes 5 and 6 by an amount substantially corresponding to the thickness (about 1–2 $\mu m$) of the layer of electrodes: 5 and 6. The protective layer 7 is formed in uniform thickness on the electrodes 5 and the opening A for the heat generating elements 4 by vaporization deposition, so that the height $H_3$ of the protective layer 7 at the opening A for the heat generating elements 4 is smaller than the height $H_4$ of the protective layer 7 on the electrodes 5 and 6 by an amount substantially corresponding to the thickness of the layer of electrodes 5 and 6. Thus the opening A through which heat is released forms a recess which is lower in elevation than the surrounding area, with a result that difficulty is experienced in bringing a printing sheet into intimate contact with the thermal head. Because of this, a thermal transfer-printed sheet provided by using paper of rough surface would have a low quality. The reason for this phenomenon will be described by referring to FIGS. 3 and 4. FIG. 3 is a transverse sectional view showing the manner in which an inked ribbon 8 and a printing sheet 9 are brought into contact with the thermal head 1 in which the thermal head is of the prior art and the printing sheet is paper of rough surface on which characters and symbols are to be printed by thermal transfer-printing. FIG. 4 shows the distribution of contact surface pressure between the printing sheet 9 and thermal head 1 maintained in contact with each other as shown in FIG. 3. As shown in FIG. 3, the surface of the printing sheet 9 which is paper of rough surface is so low in flatness that elevated regions 9*a* and depressed regions 9*b* have a differences lying in the range between 10 and 28 $\mu m$. The spacing interval or pitch p between the elevated regions 9*a* and depressed regions 9*b* is in the range between 80 and 300 $\mu m$. Meanwhile the width d (see FIG. 2) of the opening A for the heat generating elements 4 may vary depending on the size of the dots for effecting transfer printing and is generally in the range between 120 and 180 $\mu m$. As can be seen in the figures, the depressed regions of the printing sheet of rough surface have a great depth and the opening A for the heat generating elements 4 are recessed, so that it is impossible for the opening A to come into contact with the depressed regions 9*b* of the surface of the printing sheet 9 through the inked ribbon 8. Thus, even if the heat generating elements 4 generate heat to melt the ink spread on the inked ribbon 8, the melted ink could not adhere to the surface of the printing sheet 9 and voids and omission of printed characters would mar the surface of the transfer-printed sheet. To avoid this problem, it is necessary to raise the contact surface pressure between the thermal head and printing sheet to resiliently deform the printing sheet so as to temporarily render the surface of the printing sheet flat and smooth. However, when the thermal head 1 of the prior art is used, it is impossible to raise the contact surface pressure at the opening A for the heat generating elements 4, because the opening A at which the contact surface pressure should be raised is recessed and the protective layer for the electrodes 5 and 6 which has a greater height than the opening A is brought into contact with the printing sheet before the opening A is brought into contact therewith. An increase in the biasing force urging the thermal head into contact with the printing sheet would result in an increase in the contact surface pressure between the portion of the thermal head where the electrodes 5 and 6 are located. However, contact surface pressure at the opening A which is the most important location in the thermal head would not rise. As described hereinabove, the glaze layers 3 are substantially flat. Thus, even if the biasing force urging the thermal head to move is increased, the substrate of the thermal head having nothing to do with the printing operation would only be brought into contact with the printing sheet. After all, a biasing force of tremendous magnitude would be required to achieve a necessary increase in the contact surface pressure between the opening A and the printing sheet. Experiments conducted by us show that the biasing force would have to have a value of about 2 kg which is beyond the power of a thermal transfer printer of a mechanism now being produced for practical use to develop. Any modification of the mechanism would involve an increase in the number of parts and production costs and would not be economically viable.

Also, proposals have been made to improve the platen as disclosed in Japanese Utility Model Unexamined Publication No. 32043/85, for example. However, this improvement is intended to avoid a lopsided contact between the thermal head and platen, and the improvement is not directed to modifying the platen in a manner to allow thermal transfer-printing to be successfully effected on a sheet of paper of rough surface.

SUMMARY OF THE INVENTION

This invention has been developed for the purpose of obviating the aforesaid problems of the prior art. Accordingly, the invention has as its object the provision of a thermal transfer printer which is capable of providing a thermally transfer-printed sheet of high quality by printing characters and symbols on a printing sheet of rough surface, without increasing the number of parts or production costs.

According to the invention, there is provided a thermal transfer printer comprising a thermal head, and a platen positioned against the thermal head through a printing sheet, the thermal head comprising a substrate formed of heat insulating material, at least one glaze layer on a top surface of the substrate extending longitudinally thereof, a plurality of heat generating elements on the glaze layer, a plurality of electrodes each connected to the heat generating elements in a manner to form an opening for the heat generating elements and a protective layer for preventing the electrodes and heat generating elements from contacting the printing sheet to avoid their wear, wherein the improvement resides in that a portion of the protective layer for protecting the heat generating elements has a height which is greater by more than 5 μm than the height of a portion of the protective layer for protecting the electrodes, the width of the glaze layer transversely of the substrate is less than 200 μm at a location which is 10 μm below a top surface of the portion of the protective layer for the heat generating elements in a vertical direction, and the platen is a flat platen and its deflection caused to occur by biasing force exerted on the thermal head is more than 0.02 time and less than twice as great as the height of the glaze layer.

DESCRIPTION OF THE PREFERRED EMBODIMENTS

Preferred embodiments of the invention will now be described by referring to the accompanying drawings.

Figure 1:
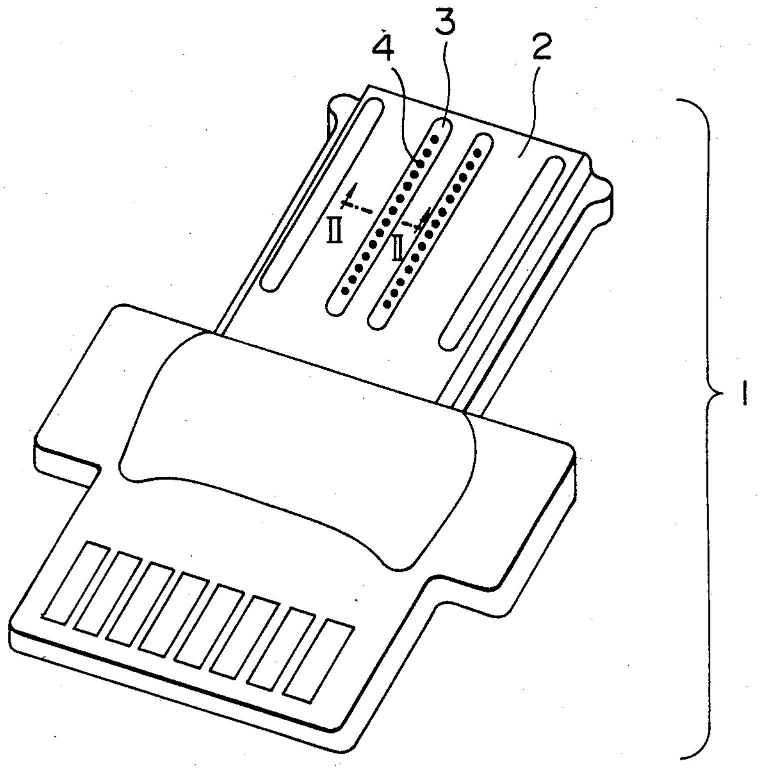
F I G. 1 PRIOR ART
FIG. 1 is a perspective view of a thermal head of the prior art.
Figure 2:
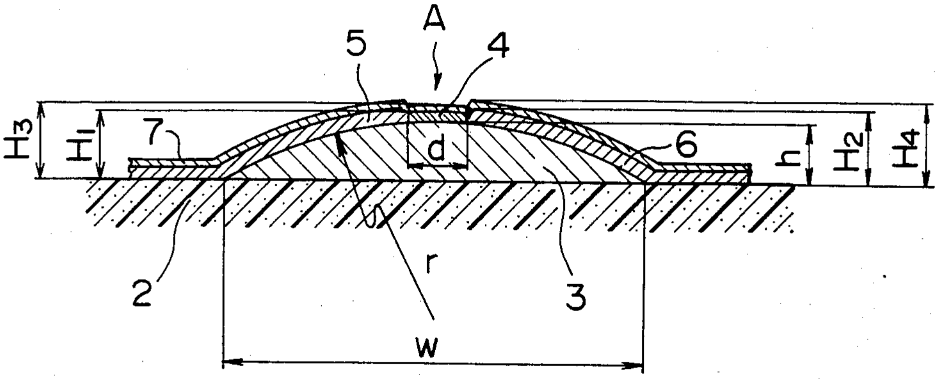
F I G. 2 PRIOR ART
FIG. 2 is a sectional view taken transversely of the substrate or along the line II—II in FIG. 1.
Figure 3:
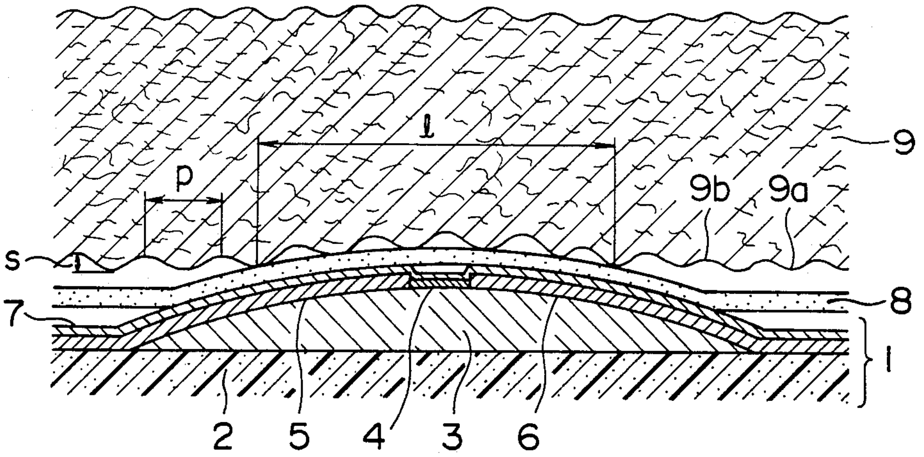
F I G. 3 PRIOR ART
FIG. 3 is a sectional view taken transversely of the substrate, showing the manner in which a thermal head of the prior art is brought into contact with a sheet of paper of rough surface.
Figure 4:
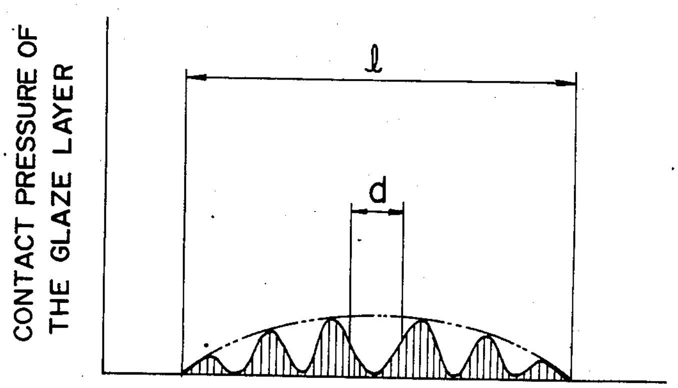
FIG. 4 PRIOR ART
FIG. 4 is a diagrammatic representation of the distribution of contact surface pressure obtained when the thermal head and the sheet of paper of rough surface are in contact with each other as shown in FIG. 3.
Figure 5:
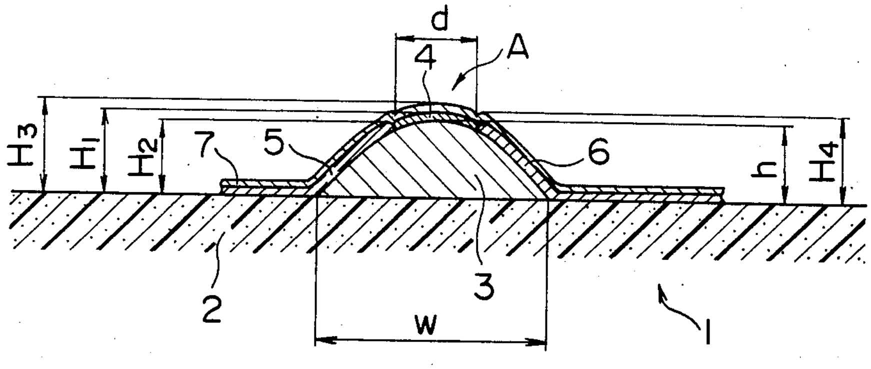
FIG. 5 is a sectional view, taken transversely of the substrate, of one constructional form of the thermal head according to the invention.

A thermal head generally designated by the reference numeral 1 in FIG. 5 comprises, like the thermal head of the prior art shown in FIGS. 1 and 2, a substrate 2 formed of heat insulating material, such as ceramic material, at least one glaze layer 3 on a top surface of the substrate 2 which extends longitudinally thereof, a plurality of heat generating elements 4 on the crest of the glaze layer 3, a plurality of electrodes 5 and 6 each connected to the heat generating elements 4 and a protective layer 7 for protecting the heat generating elements 4 and electrodes 5 and 6 from oxidation and preventing wear which might otherwise be caused thereon by contact with a printing sheet. Like the electrodes used in the thermal head of the prior art, the electrodes 5 and 6 are connected to opposite sides or the left and right sides of the heat generating elements 4 to form an opening A which defines the size of the transfer printing dots. As shown in FIG. 5, the glaze layer 3 is dimensioned such that the height $H_1$ of the crest of the heat generating elements 4 as measured from the top surface of the substrate 2 is greater than the height $H_2$ of the top of the electrodes 5 and 6 measured in the same way. Since the protective layer 7 formed on the electrodes 5 and 6 and the opening A for the heat generating elements 4 by vaporization deposition generally has a uniformly thickness, the dimensional relation between the heat generating elements 4 and the electrodes 5 and 6 established as described hereinabove gives a greater value to the height $H_3$ of a portion of the protective layer 7 for the opening A for the heat generating elements 4 than to the height $H_4$ of the portion of the protective layer 7 for the electrodes 5 and 6. By virtue of the dimensional relationship thus established between the protective layer 7, electrodes 5 and 6, heat generating elements 4 and opening A, it is possible to bring the opening A, first of all, into contact with a printing sheet 9 of rough surface through an inked ribbon 8. The results of experiments conducted by us show that the end of optimizing contact between the thermal head 1 and the printing sheet of rough surface can be attained by setting the height $H_1$ of the heat generating elements 4 and the height $H_3$ of the portion of the protective layer 7 for the heat generating elements 4 at values greater by 5 $\mu$m than the height $H_2$ of the electrodes 5 and 6 and the height $H_4$ of the portion of the protective layer 7 for the electrodes 5 and 6, respectively. The width w of the glaze layer 3 is set such that, when the thermal head 1 is forced against the printing sheet of rough surface on the platen, other portions than the opening A for the heat generating elements 4 that are not directly concerned in printing characters and symbols, such as the top surface of the substrate 2, are prevented from coming into contact with the printing sheet of rough surface. The results of experiments conducted by us also show that it is possible to perform thermal transfer printing satisfactorily by setting the width w of the glaze layer 3 at a value which is 1–4 times as great as that of the width d of the opening A. With this dimensional relationship, it has been found that other parts than the opening A, such as the top surface of the substrate 2, are prevented from coming into contact with the printing sheet of rough surface even if the biasing force exerted on the thermal head is at the same level as in the prior art. It has also been found that the same effects as described hereinabove can be achieved by setting the height h of the glaze layer 3 at a value which is more than 1/15 as great as that of the width w thereof. Moreover, to enable a forward end of the thermal head 1 to bite into depressed regions of the rough surface of the printing sheet, the width of the glaze layer 3 at a location which is 10 $\mu$m below its top surface in a vertical direction is set at less than 200 $\mu$m.

Figure 6:
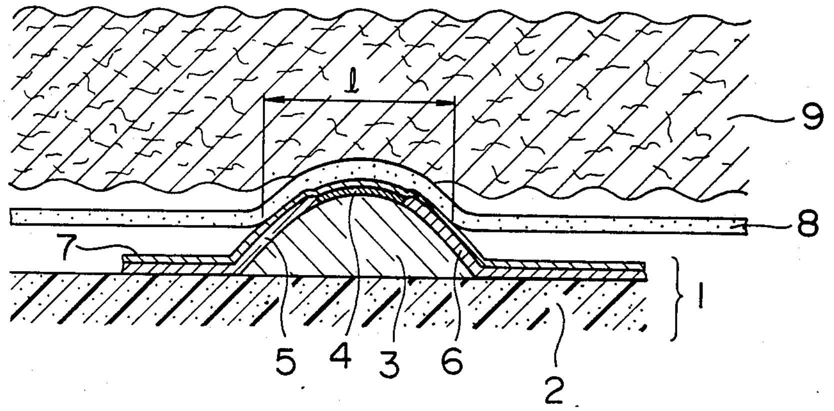
FIG. 6 is a sectional view taken transversely of the substrate, showing the manner in which the thermal head shown in FIG. 5 is brought into contact with a sheet of paper of rough surface.
Figure 7:
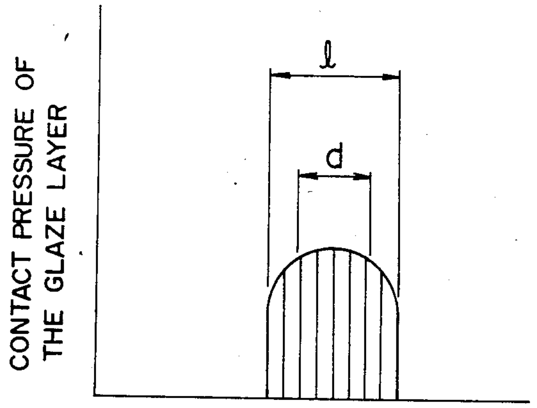
FIG. 7 is a diagrammatic representation of the distribution of contact surface pressure obtained when the thermal head and the sheet of paper of rough surface are in contact with each other as shown in FIG. 6.

FIGS. 6 and 7 show the manner in which the thermal head 1 of the aforesaid construction is brought into contact with the printing sheet of rough surface. It will be clearly seen in the figures that the contact surface between them is decreased in length and the contact surface pressure at the opening A which contributes to printing rises.

Figure 8:
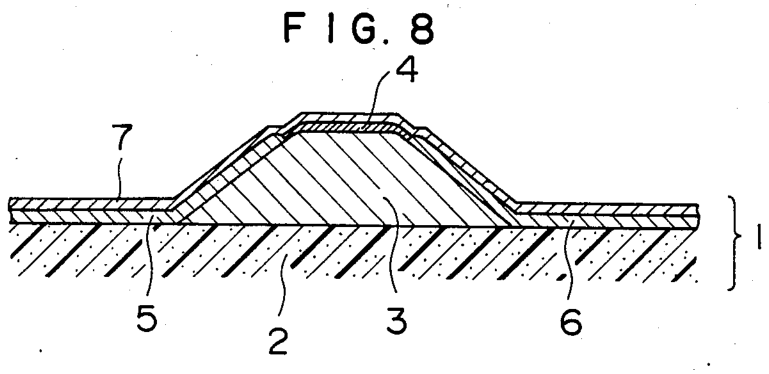
FIGS. 8, 9 and 10 are sectional views, taken transversely of the substrate, of other constructional forms of the thermal head according to the invention.
Figure 9:
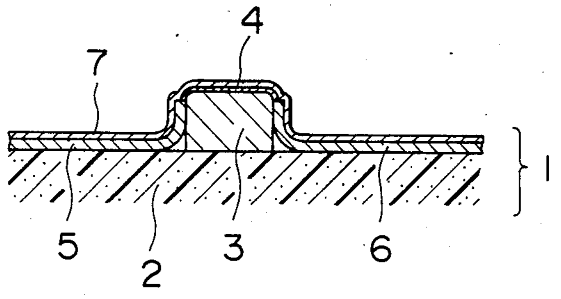
Figure 10:
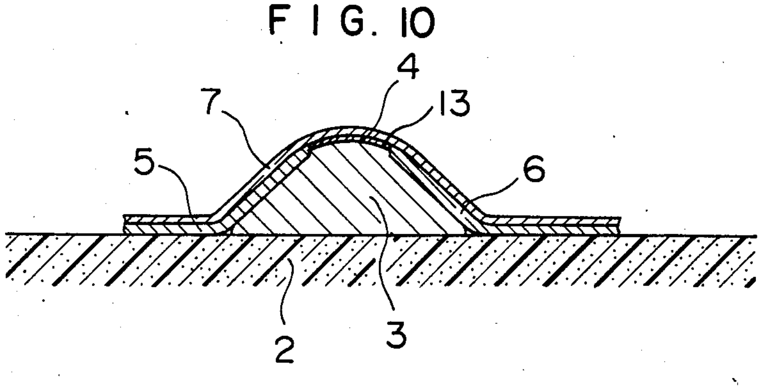

FIGS. 8, 9 and 10 show other constructional forms of the thermal head than that shown in FIG. 5. In the constructional form shown in FIG. 8, the glaze layer 3 is substantially frustoconical in cross-sectional shape as viewed transversely of the substrate 2, and the heat generating elements 4 are arranged on a planar top surface portion of the glaze layer 3 while the electrodes 5 and 6 are located on sloping surface portions. By this arrangement, the heat generating elements 4 can be located naturally at a higher level than the topmost portions of the electrodes 5 and 6.

In the constructional form shown in FIG. 9, the glaze layer 3 is substantially rectangular in cross-sectional shape as viewed transversely of the substrate 2. The heat generating elements 4 are arranged on a plannar top surface portion of the glaze layer 3, and the electrodes 5 and 6 are located along lateral side surface portions thereof. It will be evident that the same results as achieved by the constructional forms shown in FIGS. 5, 8 and 9 can be achieved by this constructional form.

In the constructional form shown in FIG. 10, the glaze layer 3 has formed at its top surface with a protuberance 13 which serves the purpose of supporting the heat generating elements 4. This is conducive to improved contact between the heat generating elements 4. This is conducive to improved contact between the heat generating elements 4 and the printing sheet of rough surface.

The platen according to the invention will now be described. As described hereinabove, platens have been available both in cylindrical form and in the form of a flat plate. The platen used in the invention is of the latter type. The reason why a flat platen is used in place of a cylindrical one is because it has been ascertained that the cylindrical platen suffers a deflection of great magnitude even if the thermal head according to the invention shown in FIGS. 5, 8, 9 and 10 is used, with a result that the top surface of the substrate of the thermal head is brought into contact with the printing sheet and no marked improvements can be expected to take place in the contact surface pressure between the opening A for the heat generating elements 4 and the printing sheet, although a slight improvement over the prior art can be achieved. Deflection can be made smaller in magnitude in a flat platen than in a cylindrical platen.

According to the invention, the deflection of the flat platen which is caused to occur by a biasing force exerted on the thermal head is set at more than 0.02 time the height h of the glaze layer and less than twice the height h of the glaze layer. By keeping the deflection in this range, it is possible to provide a printed sheet of high quality by printing characters and symbols on a printing sheet of rough surface by thermal transfer printing.

Figure 11:
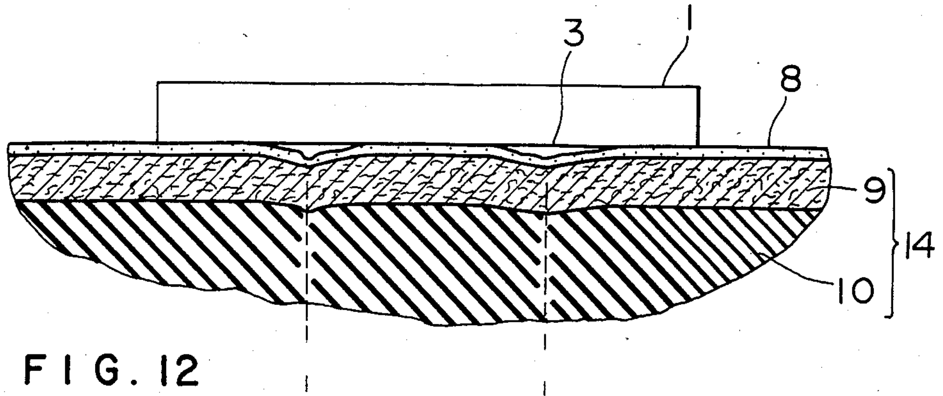
FIG. 11 is a sectional view taken transversely of the substrate, showing the manner in which the constructional form of the thermal head according to the invention shown in FIG. 10 is brought into contact with a platen of high rubber hardness through a sheet of paper of rough surface.
Figure 12:
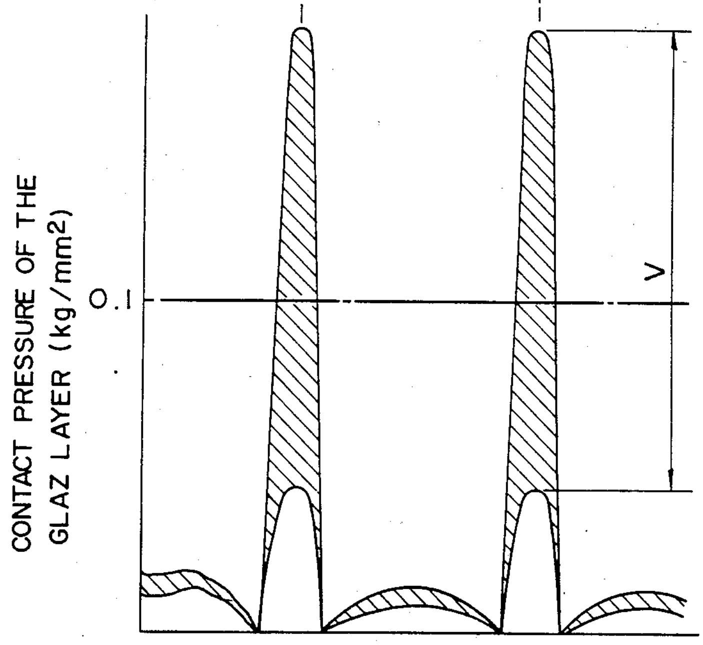
FIG. 12 is a diagrammatic representation of the distribution of surface contact pressure obtained when the thermal head is in contact with the platen as shown in FIG. 11.

FIG. 11 shows the thermal head 1 having the glaze layer 3 with a protuberance shown in FIG. 10 being maintained in contact with a platen (high rubber hardness platen) having a rubber hardness HsA 80°–90° through a printing sheet. FIG. 12 is a graph showing the distribution of contact surface pressure on the surface of the thermal head.

The protuberance on the glaze layer of the thermal head has a height of about 10 μm, and the height of the glaze layer 3 is set at 40–50 μm. Because of the high rubber hardness (HsA 80°–90°) of the platen 10, the surface pressure is concentrated on the glaze layer 3 as shown in FIG. 12. In this case, it is possible to forcedly flatten elevated regions of the printing sheet 9 of rough surface by developing a surface pressure of more than 0.1 kg/mm$^2$ with a biasing force usually used for urging the thermal head. However, as indicated by a line C in FIG. 17, the deformation of the platen is small and there are variations v of large magnitude in surface pressure as shown in FIG. 12, so that the contact between the thermal head and platen tends to become lopsided. Thus, the use of the thermal head and platen of the aforesaid construction is not suitable for printing characters on a printing sheet of rough surface by thermal transfer printing.

Figure 13:
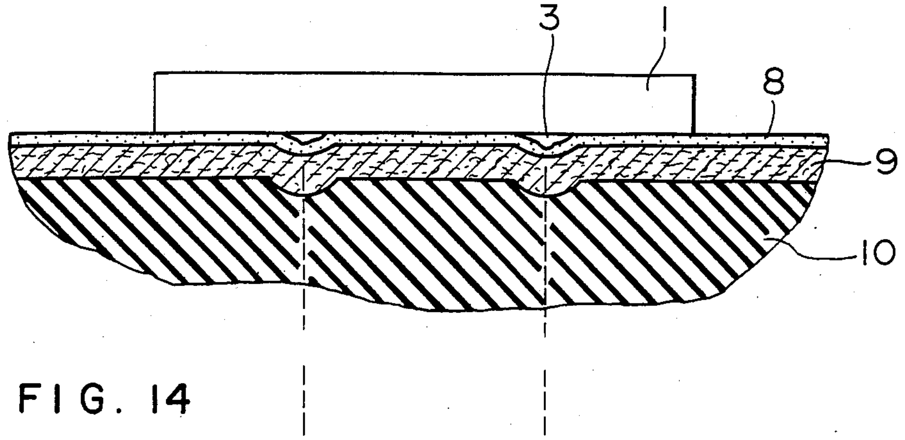
FIG. 13 is a sectional view taken transversely of the substrate, showing the manner in which the constructional form of the thermal head according to the invention shown in FIG. 10 is brought into contact with the platen according to the invention.
Figure 14:
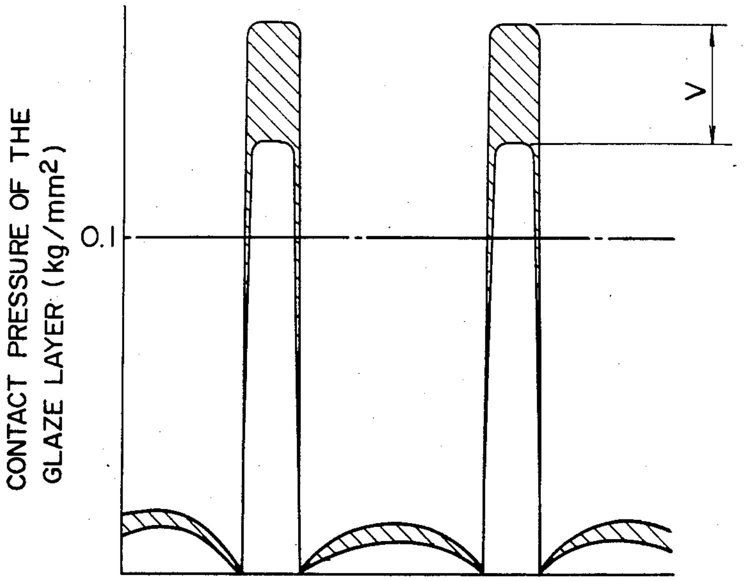
FIG. 14 is a diagrammatic representation of the distribution of surface contact pressure obtained when the thermal head according to the invention is in contact with the platen according to the invention as shown in FIG. 13.
Figure 15:
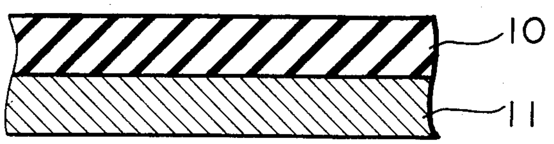
FIGS. 15 and 16 are sectional views of the platen according to the invention.
Figure 17:
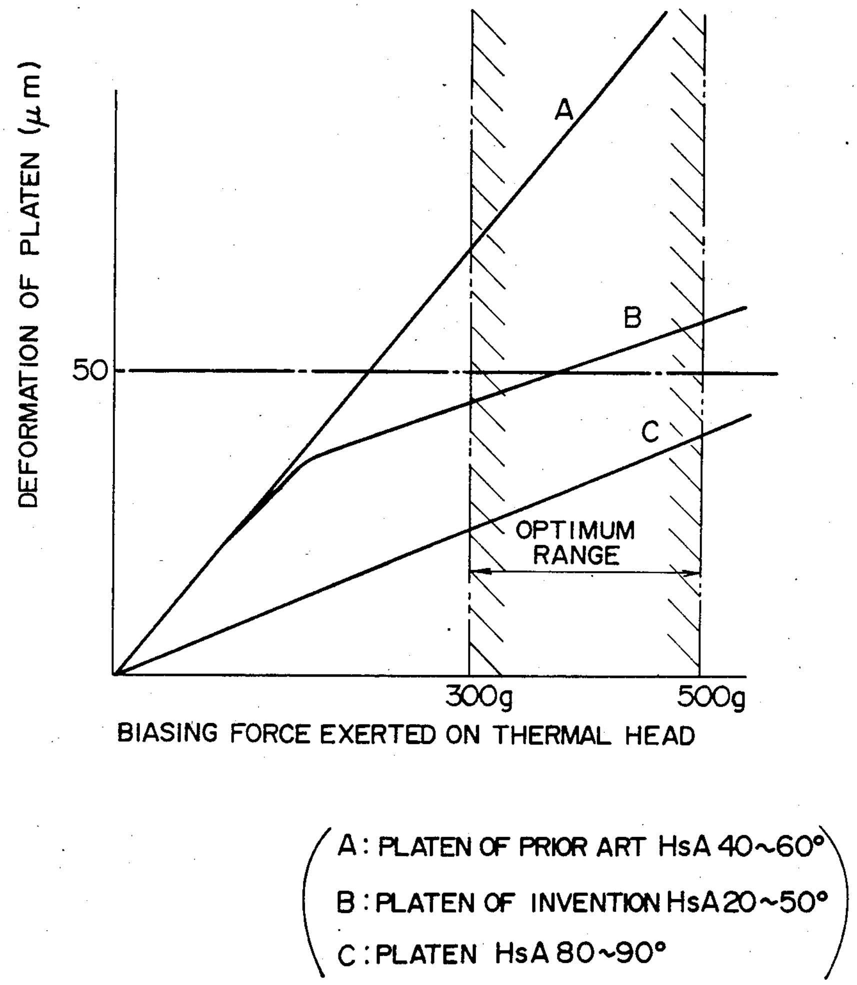
FIG. 17 is a diagrammatic presentation of the relation between the biasing force exerted by the thermal head and the deformation of the platen.

FIG. 13 shows the thermal head 1 having the glaze layer 3 with a protuberance being maintained in contact with a platen having a rubber hardness HsA 20°–50° and a thickness 0.2–1.0 mm (which is 5–20 times as great as the height of the glaze layer 3), and FIG. 14 shows the distribution of contact surface pressure on the surface of the thermal head. In this case, the surface pressure is concentrated on the glaze layer 3 and variations in surface pressure are small, so that the use of the thermal head and platen of the aforesaid construction is suitable for printing characters on a printing sheet of rough surface by thermal transfer printing. FIG. 15 is a sectional view of the platen shown in FIG. 13 in which the numeral 10 designates a rubber layer of a rubber hardness HsA 20°–50° and a thickness in the range between 0.2 and 1.0 mm, and the numeral 11 designates a support layer of hard material, such as metal or plastic material. FIG. 17 shows the relation between the biasing force exerted on the thermal head and the deformation of the platen. In FIG. 17, a line B representing the platen (HsA 20°–50°) according to the invention shows that the deformation is similar to that of the platen of the prior art represented by a line A in initial stages because of the low hardness and the small thickness. However, when the deformation draws near 50 μm which is substantially equal to the height of the glaze layer 3 of the thermal head 1, apparent rubber hardness increases because of the small thickness of the rubber layer and the high hardness of the support layer, with a result that a further deformation is avoided. That is, when the biasing force exerted on the thermal head is of the same magnitude as has hitherto been exerted in the prior art, the platen is readily deformed until the deformation becomes equal to the height of the glaze layer but a further deformation is prevented.

Figure 16:
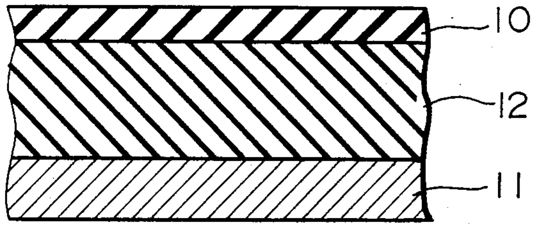

FIG. 16 shows another constructional form of the platen according to the invention which comprises a surface rubber layer 10 of a rubber hardness HsA 20°50° and a thickness 0.2–1.0 mm, a backup rubber layer 12 of a rubber hardness HsA 80°–90° and a thickness of several millimeters and a support layer 11. The constructional form shown in FIG. 16 has been found to achieve the same results as the constructional form shown in FIG. 15.

Based on the results of the experiments referred to hereinabove, the deflection of the platen according to the invention is set, as described hereinabove, at the level which is more than 0.02 time and less than twice the height of the glaze layer.

By using the thermal head and platen according to the invention, it is possible to provide a printed sheet of high quality by printing characters and symbols on a sheet of paper of rough surface by thermal transfer printing.

What is claimed is:

1. A thermal transfer printer comprising:

a thermal head; and a platen positioned against said thermal head through a printing sheet;

said thermal head comprising a substrate formed of heat insulating material, at least one glaze layer on a top surface of said substrate extending longitudinally thereof, a plurality of heat generating elements on said glaze layer, a plurality of electrodes each connected to said heat generating elements in a manner to form an opening for the heat generating elements and a protective layer for preventing the electrodes and heat generating elements from contacting the printing sheet to avoid their wear;

wherein the improvement resides in that:

a portion of said protective layer for protecting the heat generating elements has a height which is greater by 5 μm than the height of a portion of the protective layer for protecting the electrodes; the width of the glaze layer transversely of the substrate is less than 200 μm at a location which is 10 μm below a top surface of the portion of the protective layer for protecting the heat generating elements in a vertical direction, and the platen is a flat platen and its deflection caused to occur by a biasing force exerted on the thermal head is more than 0.02 time and less than twice as great as the height of the glaze layer.

2. A thermal transfer printer as claimed in claim 1, wherein said glaze layer has, as viewed transversely of said substrate, a maximum width which is 1 to 4 times as great as the width of the opening for the heat generating elements, and a height which is more than 1/15 the maximum width thereof as viewed transversely of the substrate.

3. A thermal transfer printer as claimed in claim 1, wherein said glaze layer has a substantially frustoconical cross-sectional shape as viewed transversely of the substrate, and wherein said heat generating elements are located on a planar top surface portion of the frustoconical glaze layer while said electrodes are arranged on sloping side surface portions thereof.

4. A thermal transfer printer as claimed in claim 1, wherein said glaze layer has a substantially rectangular cross-sectional shape as viewed transversely of the substrate, and wherein said heat generating elements are located on a planar top surface portion of the rectangular glaze layer while said electrodes are arranged on side surface portions thereof.

5. A thermal transfer printer as claimed in claim 1, wherein said glaze layer is formed with a protuberance at its top for mounting said heat generating elements, and wherein said electrodes are arranged on side surfaces of said glaze layer.

6. A thermal transfer printer comprising:

a thermal head; and a platen positioned against said thermal head through a printing sheet, said thermal head comprising a substrate of heat insulating material, at least one glaze layer secured to a top surface of said substrate and extending longitudinally thereof, said glaze layer being formed of a protuberance at its top surface, a plurality of heat generating elements located on the protuberance on the glaze layer, a plurality of electrodes each connected to said heat generating elements in a manner to form an opening for the heat generating elements and a protective layer for preventing the electrodes and heat generating elements from contacting the printing sheet to avoid their wear, wherein the improvement resides in that:

said glaze layer has a height in the range between 40 and 50 μm, and wherein said platen is a flat platen and comprises a rubber layer of a rubber hardness HsA 20°–50° and a thickness which is 5–20 times as great as the height of the glaze layer, and a support plate layer for supporting said rubber layer.

7. A thermal transfer printer as claimed in claim 6, wherein said flat platen comprises an additional rubber layer of a rubber hardness HsA 80°–90° interposed between said rubber layer and support plate layer.

* * * * *